United States Patent
Findeisen et al.

(10) Patent No.: US 9,477,893 B2
(45) Date of Patent: Oct. 25, 2016

(54) POSITIONING SYSTEM AND METHOD FOR POSITIONING A VEHICLE

(71) Applicant: SIEMENS AKTIENGESELLSCHAFT, Munich (DE)

(72) Inventors: Michel Findeisen, Erlau ot Milkau (DE); Markus Hess, Sehmatal-Sehma (DE); Gangolf Hirtz, Kronach (DE); Rainer Knorr, Regensburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 370 days.

(21) Appl. No.: 14/040,940

(22) Filed: Sep. 30, 2013

(65) Prior Publication Data

US 2014/0092236 A1    Apr. 3, 2014

(30) Foreign Application Priority Data

Sep. 28, 2012  (EP) .................................. 12186619

(51) Int. Cl.
| | | |
|---|---|---|
| *H04N 7/00* | (2011.01) | |
| *H04N 7/18* | (2006.01) | |
| *G06K 9/00* | (2006.01) | |
| *B62D 15/02* | (2006.01) | |
| *B60L 11/18* | (2006.01) | |

(52) U.S. Cl.
CPC ........ *G06K 9/00791* (2013.01); *B60L 11/1829* (2013.01); *B60L 11/1833* (2013.01); *B60L 11/1835* (2013.01); *B62D 15/028* (2013.01); *B62D 15/0285* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ... B62D 15/0285; B60R 1/002; B60R 1/006; B60R 1/007; B60R 1/08; B60R 1/10; G06K 9/00791; G06K 9/00812
USPC ......................................... 348/113, 118, 119
See application file for complete search history.

(56) References Cited

U.S. PATENT DOCUMENTS

| | | | |
|---|---|---|---|
| 8,169,186 B1 | 5/2012 | Haddad et al. | |
| 8,274,648 B2 | 9/2012 | Corghi | |
| 9,056,554 B2 | 6/2015 | Nagy | |
| 9,073,442 B2 | 7/2015 | Ichikawa | |
| 2009/0040068 A1* | 2/2009 | Oyobe | ............... B60L 11/123 340/932.2 |
| 2009/0290032 A1* | 11/2009 | Zhang | ...................... B60R 1/00 348/211.9 |

(Continued)

FOREIGN PATENT DOCUMENTS

| | | |
|---|---|---|
| CN | 101842660 A | 9/2010 |
| CN | 102194284 A | 9/2011 |

(Continued)

*Primary Examiner* — Mehrdad Dastouri
*Assistant Examiner* — Jared Walker
(74) *Attorney, Agent, or Firm* — Laurence Greenberg; Werner Stemer; Ralph Locher

(57) ABSTRACT

A positioning system for a vehicle includes a camera, a processor unit and a data storage device. A length relating to a feature of the vehicle is stored in the data storage device. The vehicle is positioned for an inductive charging process in that the vehicle is recorded by a camera and a feature of the vehicle is detected. The position relating to a feature is calculated.

16 Claims, 4 Drawing Sheets

(56) References Cited

U.S. PATENT DOCUMENTS

| | | | |
|---|---|---|---|
| 2010/0049402 A1* | 2/2010 | Tanaka | B60R 1/00 701/41 |
| 2010/0201309 A1* | 8/2010 | Meek | B60L 11/1816 320/108 |
| 2011/0087417 A1* | 4/2011 | Anderson | B60Q 1/48 701/96 |
| 2012/0029750 A1* | 2/2012 | Ortmann | B60L 11/1818 701/22 |
| 2012/0095617 A1 | 4/2012 | Martin | |
| 2012/0126748 A1* | 5/2012 | Haddad | B60L 11/1835 320/109 |
| 2012/0148092 A1* | 6/2012 | Ni | G06K 9/00785 382/103 |
| 2012/0191343 A1* | 7/2012 | Haleem | G01C 21/3697 701/431 |
| 2012/0203410 A1* | 8/2012 | Wechlin | B60L 11/182 701/22 |

FOREIGN PATENT DOCUMENTS

| | | |
|---|---|---|
| DE | 4009668 A1 | 10/1991 |
| DE | 102011111051 A1 | 3/2012 |
| DE | 102011005386 A1 | 9/2012 |
| DE | 102011109834 A1 | 2/2013 |
| WO | 2011114208 A3 | 2/2012 |

\* cited by examiner

POSITIONING SYSTEM AND METHOD FOR POSITIONING A VEHICLE

CROSS-REFERENCE TO RELATED APPLICATION

This application claims the priority, under 35 U.S.C. §119, of European patent application No. 12186619.8, filed Sep. 28, 2012; the prior application is herewith incorporated by reference in its entirety.

BACKGROUND OF THE INVENTION

Field of the Invention

The invention relates to a positioning system for positioning a vehicle, and to a method for positioning a vehicle.

If a vehicle has an electrical energy storage device and an electrical energy consumer for propulsion of the vehicle, then a charging process or a charging device must be provided. Examples of such vehicles are hybrid vehicles, plug-in hybrid vehicles, electric vehicles without a combustion engine, electric-powered trucks, etc. Such vehicles are becoming increasingly important as a result of evolving mobility requirements; low level energy consumption and low emissions in particular are advantageous. The energy storage device is a component of these vehicles. In many cases this is designed as battery storage. Capacitors could also be used. NiMH and Li-ion accumulators are used as batteries, for example. The size and consequently the maximum amount of energy stored by such storage devices depend on the application. For example, the size of energy storage devices of plug-in hybrids for passenger vehicles is up to 20 to 30 kWh. If a passenger car is a pure electric vehicle without a combustion engine for propulsion, the size of the energy storage device may vary between 40 and approx. 50 kWh (or, e.g., 40, 60, 85 kWh). Depending on the respective application, other capacity sizes can also be selected for the energy storage device, it being entirely possible, for example, that a taxi may require approx. 100 kWh. In general, the maximum range of plug-in hybrid vehicles (passenger vehicles) in purely electric operation is currently approx. 50 km and that of purely electric road vehicles (passenger vehicles) up to 100 to 150 km (or, up to 125, 200, 265 miles). The energy storage device must be subsequently recharged. Depending on the application, the design of the vehicle and the development of battery technology, the mileage may deviate considerably from the above values.

The energy storage device of the vehicle is charged, for example, using an on-board charging device which draws its charging energy from a home network, company network or from a public charging station, with the on-board charging device being connected to the respective power supply system via a cable. By using a cable, a mechanical connection is to be made between the two components, in other words, the power supply system and the vehicle with the electrical energy storage device, in order to charge the vehicle. This constitutes a restriction of use and/or a restriction of convenience for a user because they either have to handle the cable or because cable-based charging involves moving mechanical components which can wear out and/or be damaged while being handled. If a connecting plug of the cable is very heavy or the cable is very long, dirty and/or wet, for example, the willingness of a user of the cable-based charging system to charge the vehicle diminishes. This also reduces the acceptance of vehicles which use an electric engine to propel the vehicle.

SUMMARY OF THE INVENTION

It is accordingly an object of the invention to provide a positioning system and a method for positioning a vehicle which overcome a variety of the above-mentioned disadvantages of the heretofore-known devices and methods of this general type and which provides for a positioning system and a method for positioning a vehicle by way of which inductive charging of the vehicle is optimized.

With the foregoing and other objects in view there is provided, in accordance with the invention, a positioning system for a vehicle, comprising:
 a processor unit and a camera connected to said processor unit; and
 a data storage device connected to said processor unit and configured to store therein an item of information relating to a feature of the vehicle. In particular, the item of information stored in the data storage device is a length, or a spacing distance between features.

If an inductive charging system is used to charge an electrical energy storage device of a vehicle (in other words, to charge the vehicle), the charging efficiency level depends inter alia on the positioning of the induction bodies employed in relation to each other. An induction body is, for example, a primary coil, and a further induction body is a secondary coil (the vehicle exhibits the secondary coil). Inductive charging may take place by means of just one primary coil and just one secondary coil, or by means of one primary coil and a multiplicity of secondary coils, or by means of a multiplicity of primary coils and one secondary coil, or by means of a multiplicity of primary coils and a multiplicity of secondary coils. The respective primary coil must occupy a charging position in relation to the respective secondary coil. Depending on the position occupied, the level of energy transmission efficiency between the primary and secondary coil may be better or worse than in another position. Advantageously the position is optimized.

In an embodiment a vehicle (e.g., a passenger vehicle) occupies or drives into a particular position (x,y) within a defined area (e.g. garage, parking lot, parking space, . . . ), for the purpose of "inductive charging". This particular position, which is determined by a charging module set into the ground or fixed there, is static. The position, in other words, the location of the charging module in a coordinate system, in particular a world coordinate system, is known. The position is therefore stored in a data storage device, the stored positioning data being used to calculate the position of a vehicle in relation to this charging module. With the position of the charging module, the position of a primary coil is also known as this is fixed in the charging module. The primary coil represents the unit of a charging device which can generate electromagnetic fields or magnetic fields as a power module. Storage of the position of the charging module or the primary coil is synonymous. The positions pertain, for example, to the position in a two-dimensional coordinate system (x, y) or in a three-dimensional coordinate system (x, y, z). The use of a Cartesian coordinate system is advantageous but not mandatory. In order to be able to approach the position of the charging module or of the vehicle or of the vehicle in relation to the charging module with corresponding accuracy, in an embodiment a driver of the vehicle is informed of the required and/or actual position. A Human Machine Interface in the form of a display on a wall or in the vehicle, for example, is provided for this purpose.

In an embodiment of the positioning system for charging a vehicle, the positioning system has a camera, a processor unit and a data storage device, information relating to one feature of the vehicle, in particular information about the length, being stored in the data storage device. With the aid of a photograph taken by the camera, after recognition of at least one feature of the vehicle, information based on the recognized feature is ascertained and with the aid of the information stored about the vehicle a calculation regarding the position of the vehicle is performed.

In a further embodiment the identity and/or type of the vehicle is detected by means of camera-based license plate recognition. Alternatively, it is also possible for a vehicle to be identified via a radio transmission system (e.g. by means of an RFID chip). If the vehicle is identified, a feature (or a multiplicity of features) stored in a data storage device is accessed, the feature being used to calculate the position of the vehicle. Data concerning this vehicle which is stored in a data storage device can therefore be used to calculate the position of the vehicle.

In an embodiment of the positioning it may therefore be ascertained whether and to what degree an actual position of the vehicle deviates from a position necessary for inductive charging (required position). This can be displayed to a driver. Furthermore, it may be ascertained how the driver must move the vehicle in order to approximate the actual position to the required position. In order to enable sensor-based navigation of the vehicle its position must therefore be determined, an optical sensor (in particular a camera) being used for this purpose. The use of a mono camera reduces the technical outlay compared with the use of a stereo camera or an even greater number of cameras.

The use of 3-D world coordinates is advantageous in determining the position of the vehicle. In an embodiment distinctive measurement points (headlamps, exterior rear-view mirrors, etc.) are selected on the vehicle for this purpose. The following approaches, by way of example, can be taken for position fixing:
  the use of stereo cameras for direct determination of 3-D world coordinates from 2-D image coordinates with the aid of two statically linked images;
  a "Structure-From-Motion" approach for the indirect determination of 3-D world coordinates of the features from the movement of the vehicle with the aid of a mono camera;
  the determination of base points of the vehicle and calculation of the 3-D positions of these points by means of extrinsic calibration of the camera, wherein in an embodiment of a method for positioning a vehicle a mono camera is extrinsically calibrated.

In an embodiment of the positioning system the processor unit is linked to a Human Machine Interface (HMI) using data technology, i.e., they are linked in data technological terms. That is, communication takes place, in particular, by way of the following:
  by radio;
  by cable; and/or
  within the device as the HMI and processor unit form a module.

Merging and communication of the information obtained in relation to the position and if applicable, to additional improved positioning takes place by means of the HMI (e.g. a display). The information obtained about the position and orientation of the vehicle can be presented to the driver in the form of a GUI. The driver can use this information to correct the position of the vehicle.

In an embodiment of the positioning system in the data storage device a position of a stationary target unit, in other words, of the charging module in particular is stored, the charging module being part of a charging station for the inductive charging of an energy storage device of a vehicle. As the target unit is stationary, a mono camera can be used.

With the above and other objects in view there is also provided, in accordance with the invention, a method for positioning a vehicle for an inductive charging process, the method comprising:
  recording the vehicle by a camera;
  detecting at least one feature of the vehicle; and
  calculating a position relating to the at least one feature.

In other words, in a method for positioning a vehicle for an inductive charging process, the vehicle is recorded by a camera, in particular a mono camera, wherein a feature or a multiplicity of features, for example, a license plate, an exterior rear-view mirror, a headlamp of the vehicle, etc. is detected, a position of the vehicle in relation to the feature being calculated. To enable improved accuracy, two features at a distance from each other such as e.g. front headlamps, reversing lights, exterior rear-view mirrors are detected, their distance from each other being determined in a photograph taken by the camera.

In an embodiment a length, in particular a distance or a measurement of a feature (e.g. the length of a license plate) which depends on one of the detected features is therefore calculated, wherein the position is calculated from the length and a value saved for this feature, which can also be related to the length. Calculation takes place in particular using a world coordinate system, in particular the world coordinate system being determined by a position of a primary coil of a charger or a charging module for the vehicle.

In an embodiment of the method for positioning, a value for a focal length of the camera is used for the calculation of the position of at least one feature of the vehicle and/or the position of the vehicle. The calculation of the position therefore depends on the camera used. Advantageously an arithmetic unit can be used for various cameras of different types by changing the value for the focal length of the camera into a calculation formula to determine the position. If the focal length is an adjustable variable parameter, another camera of a different type or focal length may be used if a camera is replaced owing to a fault.

In an embodiment of the method for positioning, driving instructions are generated from an actual position of the vehicle and a required position of the vehicle, the driving instructions being displayed by means of a Human Machine Interface in particular. The driving instructions relate to the movements of the vehicle necessary for optimization of the position. The driving instructions may also be directly transmitted to a driver assistance system which drives the vehicle automatically. This driver assistance system may, for example, also be used as an automatic parking assistant.

In the inductive charging of vehicles the entry of a foreign body between the floor of the vehicle and the charging module located on the floor, in particular set into the floor, cannot be ruled out. The following are examples of foreign bodies: coins, beverage cans, chewing gum wrappers. This problem results in reduced operation and safety. For this reason relevant foreign bodies are advantageously detected via sensors. This is performed, for example, by means of inductive sensors whereby magnetic foreign bodies such as aluminum foil, coins, etc. can be detected. For this purpose e.g. a further sensor coil is applied to both the primary and the secondary side via the surface of an induction coil. This measurement coil is operated using a high-frequency alternating current to ensure sufficient frequency space for the harmonic waves of the actual energy field. The measurement field serves to detect magnetic foreign parts in the energy field.

In a further embodiment the sensors are based on transients in the current which are detected via spectral analysis and serve to detect a foreign body in the energy field.

In the case of a high frequency based sensor with a high frequency operated inductive sensor, two sensor plates can be used, for example, one being incorporated into the charging station and the other into the vehicle. The coil arrangement is such that at most small metallic parts (e.g. cent coins) cause interference in the high frequency field, as a result of which foreign body detection is enabled. Selection of the operating frequency of the high frequency field must be sufficiently high to prevent harmonic waves in the performance field from influencing this if possible.

The presence of a foreign body can also be displayed on an HMI.

Other features which are considered as characteristic for the invention are set forth in the appended claims.

Although the invention is illustrated and described herein as embodied in positioning system and method for positioning a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
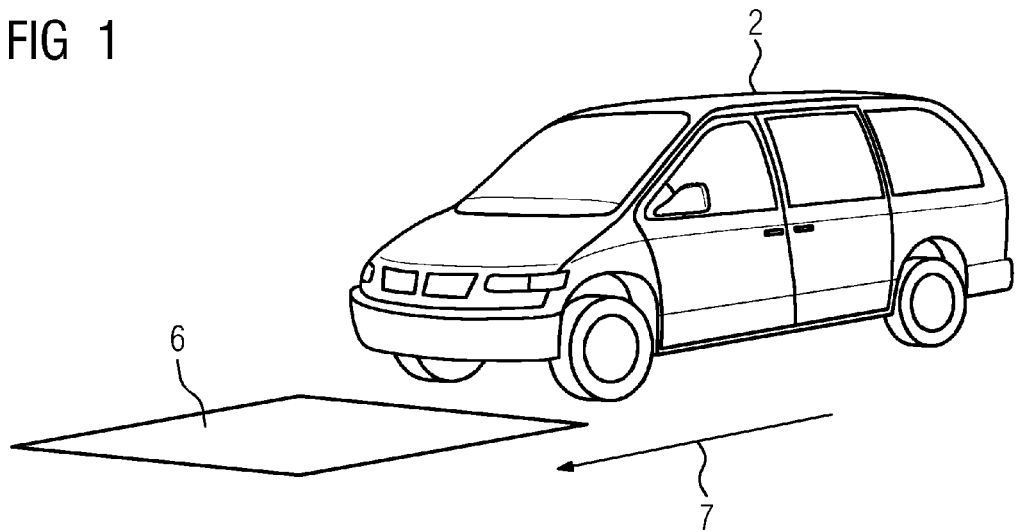
FIG. 1 is a perspective view of a vehicle approaching a charging module.

Referring now to the figures of the drawing in detail and first, particularly, to FIG. 1 thereof, there is shown a vehicle 2 approaching a charging module 6 along a navigation direction 7 to charge an electrical energy storage device. There are various approaches to solving the problem of positioning the vehicle. For example, the road surface may have recesses which force the vehicle into the preferred position and retain it there. Several coils on the underside can also be used as an approach. However, this requires increased structural measures as well as expense. Ultrasonic sensors for distance detection on the vehicle can also be used to support positioning (parking assistant). However, an object in front of the vehicle must ensure the possibility of distance measurement. This is available in a garage but is not possible in an open parking lot or carport. In addition, with distance measurement to an object, longitudinal positioning but not transverse positioning is possible. However, if objects such as, say, tires are stored in a garage, the ultrasound sensors are able to detect the distance to these obstacles but not the absolute position in relation to the garage and thus in relation to the charging station. The position can also be detected via the field distribution of, say, five transmitter coils in the vehicle coil system by means of a measurement of the field distribution by a receiver coil in the coil system on the ground. However, this near-field detection provides no further opportunity for influencing the positioning of the vehicle when approaching the charging station. However, these positioning variants are not illustrated in FIG. 1.

Figure 2:
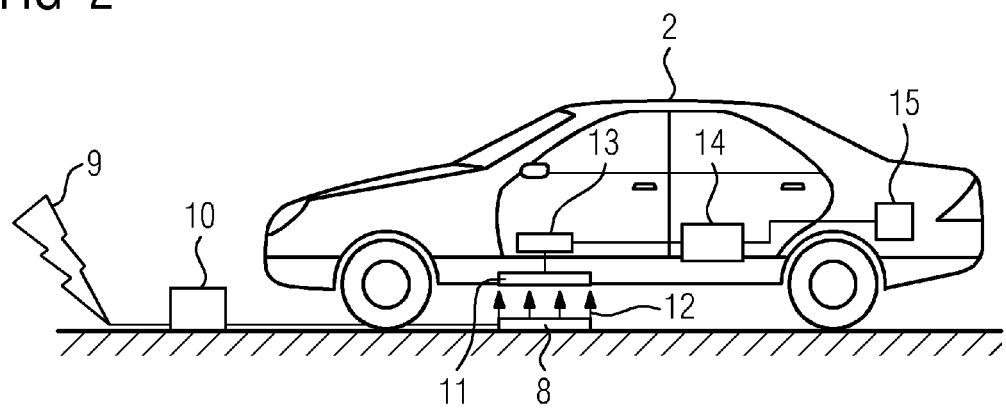
FIG. 2 is a schematic diagrammatic view of a vehicle being charged.

The illustration in accordance with FIG. 2 shows a vehicle 2 being charged. In the case of inductive charging systems a mechanical connection is not made from the on-board charging device to the power supply system. Energy transfer takes place via the air gap 12 of a coil system which may be at spacing distance of up to 20 cm. In general, a primary coil 8 is located on the ground for this purpose. The second coil, the secondary coil 11 is located on the underside of the vehicle 2. Both coils, usually equal in size, have a diameter of up to 60 cm. If the coil 8 on the ground is supplied with an alternating current, a magnetic field develops between the coil pair 8 and 11, via which the energy is transmitted from the power supply system 9 via a power unit 10 into the vehicle 2. In the vehicle 2, energy transmission takes place via a rectifier 13 and a DC/DC converter 14 to an energy storage device 15, the battery.

This is a major improvement in terms of convenience and increases the availability of electric vehicles considerably as the charging process of the energy storage device can also take place automatically, without the active assistance of the driver. Provided that the two coils 8 and 11 of the charging system are directly facing each other, the level of efficiency is more than 90%. If the two coils are not positioned on top of each other but are offset, for example, by more than by 10 cm, the level of efficiency is significantly reduced. The challenge is to position the vehicle as accurately as possible when parking so that both coils are preferably facing each other.

Figure 3:
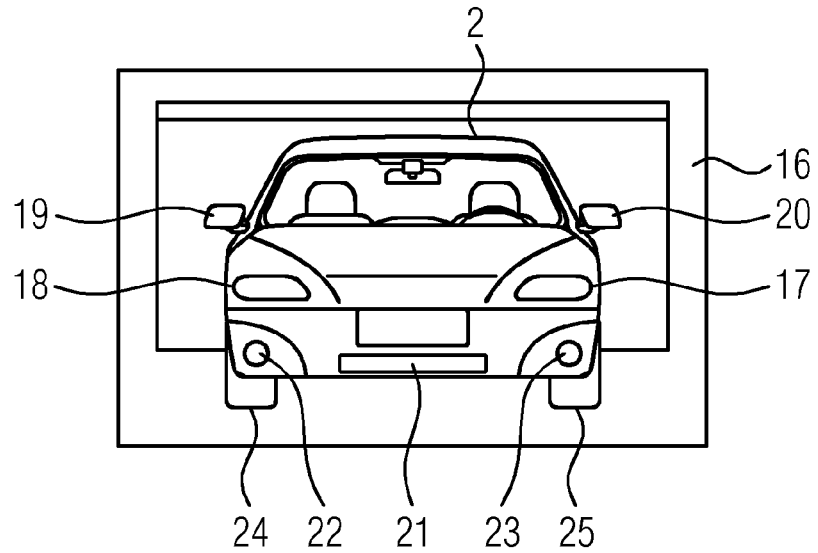
FIG. 3 is a photographic image of a vehicle.

The illustration in accordance with FIG. 3 shows a photograph 16 of a vehicle 2 taken by a camera. Sufficiently precise optical identification of the vehicle 2 in particular in a garage environment may be associated with a multiplicity of challenges. The vehicle has large, broadly featureless, differently reflecting surfaces which can result in erroneous measurements using an optical sensor (camera). The optical sensor is limited in its dynamic range and may be only partially suited to widely varying lighting conditions. In simple cameras, normally the aperture can only be mechanically configured manually. Furthermore, vehicle types of different designs must be taken into consideration. Pedestrians walking in front of the vehicle while it is approaching the charging station are a further possible disruption.

The position and orientation of the vehicle in relation to the measurement system or to the charging module and thus to the world, is ascertained by means of the detection of distinctive points on the vehicle, such as e.g. headlamps, wheels, license plate etc. For the determination of absolute measured values (distances, widths, . . . ) using a camera, a reference variable on the vehicle is required such as e.g. the spacing of the headlamps, spacing of the wheels or the size of the license plate. This information can be extracted from the image data e.g. by means of a calibration target (object of known measurement). In a further embodiment the corresponding data can also be obtained from a database, in other words from the data storage device.

Various distinctive features of the vehicle 2 are depicted in Photograph 16, namely:
a right exterior rear-view mirror 19;
a left exterior rear-view mirror 20;
a right headlamp 18;
a left headlamp 17;
a right fog lamp 22;
a left fog lamp 23;
a right front tire 24;
a left front tire 25; and
a license plate 19.

The distance between the same features (e.g. fog lamps) but also between different features (e.g. right exterior rear-view mirror 19 and left fog lamp 23) can be ascertained by means of Photograph 16. This value can be used via the intercept theorems and stored values for this respective distance to calculate the position. Position fixing is therefore based on an optical system which detects the absolute position of the vehicle in the garage with the aid of an external camera system and in this way gives the driver instructions via a display or an optical alarm (see FIG. 4) for the accurate positioning of the vehicle. The vehicle approaches a certain position (x,y within a demarcated area, e.g. garage) for the purpose of "inductive charging". This position, established by a charging module located on the ground, is presumed to be static and its location known. To approach the position with corresponding accuracy, the driver is informed of the required and actual position. For sensor-based navigation of the vehicle, its current position is constantly measured by means of a camera system.

The process of positioning takes place in such a way that the distinctive features established during the calibration of the system are searched for in the current image. After detection of these features, the actual position in the world coordinate system is established by means of a measurement in the photograph. In this way it is possible to determine the position of the vehicle in relation to the desired reference position (charging station) with accurate-to-the-centimeter precision.

Figure 4:
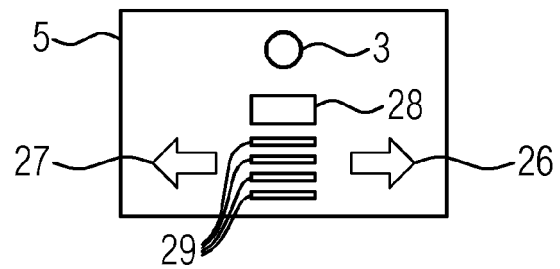
FIG. 4 is a schematic of a Human Machine Interface.

The illustration in accordance with FIG. 4 shows a Human Machine Interface (HMI) 5. This also shows the camera 3, and direction indicators 26 and 27 which can be automatically activated. A motion indicator (in particular depending on a suggested speed for approaching the target position), as well as a distance indicator with regard to the target position can be realized by means of bars 29. Furthermore, there is a STOP indicator 28 which signals that the required position has been reached. Instructions can therefore be transmitted to the driver regarding the steering angle (left/right) and stopping position by way of warning lights, a screen or acoustic signals.

This driver interface has the advantage that all vehicles can be positioned without the need for internal driver assistance systems. In a further embodiment it is possible to transmit the ascertained vehicle position to the vehicle (e.g. by means of radio technology) and to use the existing display instruments in the vehicle in optical as well as acoustic form as a Human Machine Interface.

Figure 5:
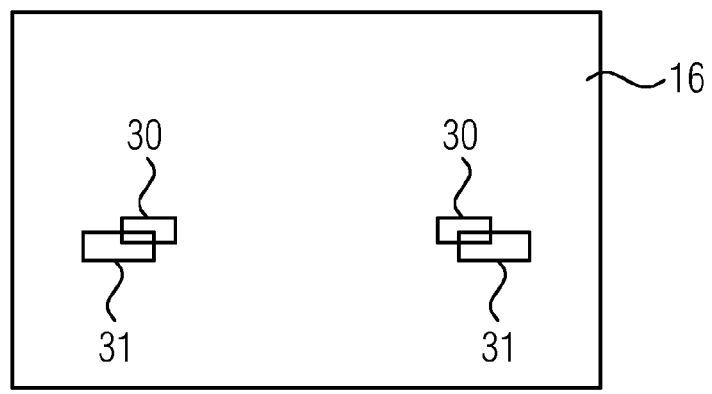
FIG. 5 shows a comparison of features of a vehicle.

The illustration in accordance with FIG. 5 shows a photograph in which detected features 30 (headlamps) are depicted and the reference position 31 of the headlamps is also inserted. The detected features 30 are at a shorter distance from each other than the reference features 31. The actual position of the vehicle can be calculated from this. A basic concept of this calculation will be shown in FIG. 6.

Figure 6:
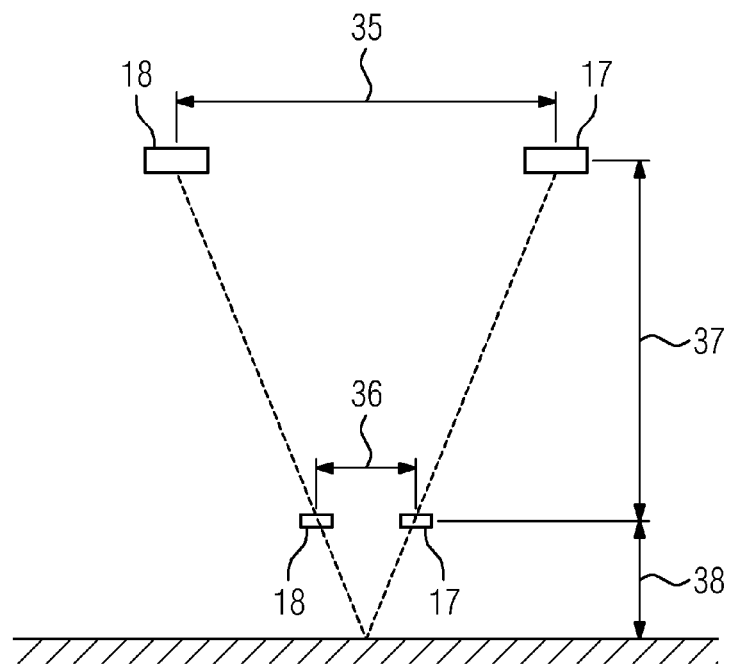
FIG. 6 is a diagram of a calculation approach to position fixing.

The illustration in accordance with FIG. 6 shows a beam system diagram. Headlamps 17, 18 are shown. Furthermore, the following is illustrated:
a distance 37 between camera and vehicle;
a focal length 38 of the camera;
a spacing distance 35 of the features 17 and 18; and
a distance 36 of the features 17 and 18 in the photograph taken by the camera.

In this case it is assumed that the front of the vehicle is displayed on a sensor surface of the camera. Information is lost in the process as a 3-D space is reproduced on a 2-D plane. To be able to determine the position of the vehicle in the 3-D space, it is therefore necessary to have more information. This information is generated from the selected distinctive features which are detected in the photograph. The distance of these features in the photograph is calculated. As the distance between the distinctive features in the world coordinate system and the imaging properties (in particular the focal length) of the optical sensor are known, with the help of the intercept theorems the precise distance of the vehicle to the camera can be determined. Taking into account a one-off "extrinsic calibration," the precise position of the features in the world coordinate system can thus be calculated. Hence a calculation result is produced by a triangulation. The distance of the camera from the vehicle and therefore the absolute positioning of the vehicle can be calculated. The following formulae provide the basis for this:
where:

$$\frac{d_I}{f} = \frac{d_M}{d_{K-F} + f} \quad (1)$$

$$d_I = \sqrt{(y_{I,left} - y_{I,right})^2 + (x_{I,left}, -x_{I,right})^2} \quad (2)$$

$d_I$—distance 36 in the photograph;
f—focal length 38;
$d_M$—distance 35 of the features;
$d_{K-F}$—camera-vehicle distance 37;
$y_{I,\,left}$: y-value of a left hand side feature;
$y_{I,\,right}$: y-value of a right hand side feature;
$x_{I,\,left}$: x-value of the left hand side feature; and
$x_{I,\,right}$: x-value of the right hand side feature.

In the positioning procedure, the 3-D world points of the features obtained are compared to those of the reference world points which were calculated in a one-off calibration process in which the vehicle was parked in an optimum position. The difference between the points describes the direction in which the vehicle must be driven by the driver and can be communicated to him.

Figure 7:
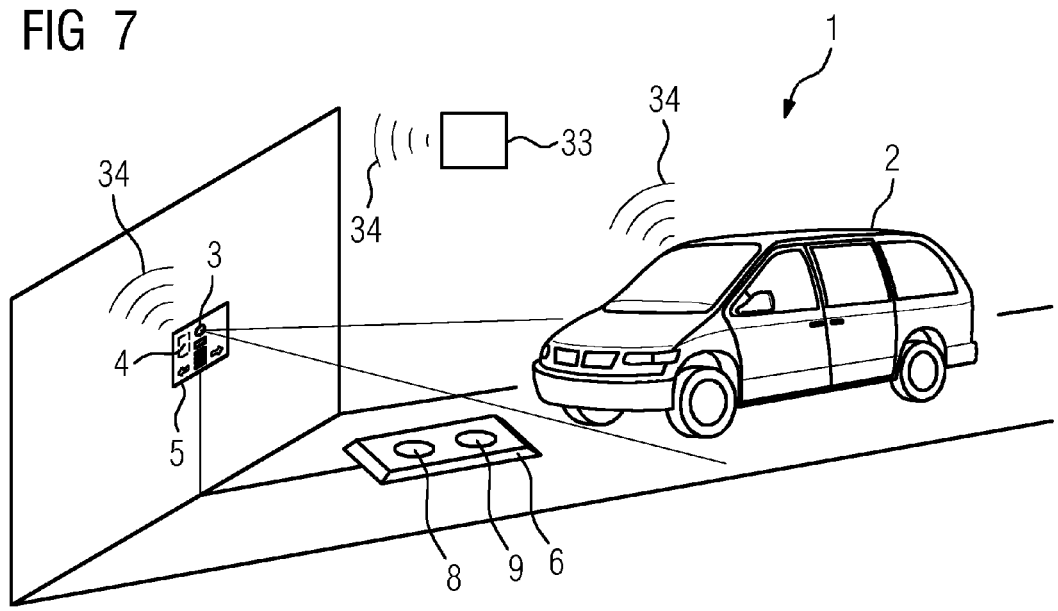
FIG. 7 is a perspective view of a charging and positioning system.

The illustration in accordance with FIG. 7 shows a positioning system with a vehicle 2, an HMI 5 and a charging module 6. The HMI 5 shows the camera 3 and a processor unit 4 for calculating the position of the vehicle 2 and for directing the vehicle. The HMI has optical equipment for this purpose. The HMI 5 can exchange data with a data storage device 33 (in particular a server on the internet) via a radio signal 34. Reference data concerning features of a vehicle, for example, are stored in the data storage device 33. However, the data storage device may also be located in the HMI unit itself. The vehicle itself can also transmit reference data via the radio signal 34. The optical measurement system (the camera) is located in front of the vehicle 2 to be detected. It is immaterial whether the vehicle approaches the charging station forwards or in reverse. The entire approach route to be measured is in the field of vision of the statically mounted camera system. Furthermore, the charging station is located in the field of vision of the camera system. The charging station with the charging module 6 and the primary coils 8 and 9 located therein defines the so-called world coordinate system and therewith the reference for all the measurements. The position of the camera 3 in relation to the charging station is obtained by means of one-off "extrinsic calibration". For this reason, the position and orientation of the camera in relation to the charging station is known. In such a way the optical positioning of the vehicle is therefore possible with accurate-to-the-centimeter precision. The identification of the vehicle in a 3-D world coordinate is advantageous using a mono camera within the context of vehicle positioning, wherein in particular vehicle position detection is then robust if the headlamps are used for detection. A reliable service is provided even under widely varying (day/night) lighting conditions.

Figure 8:
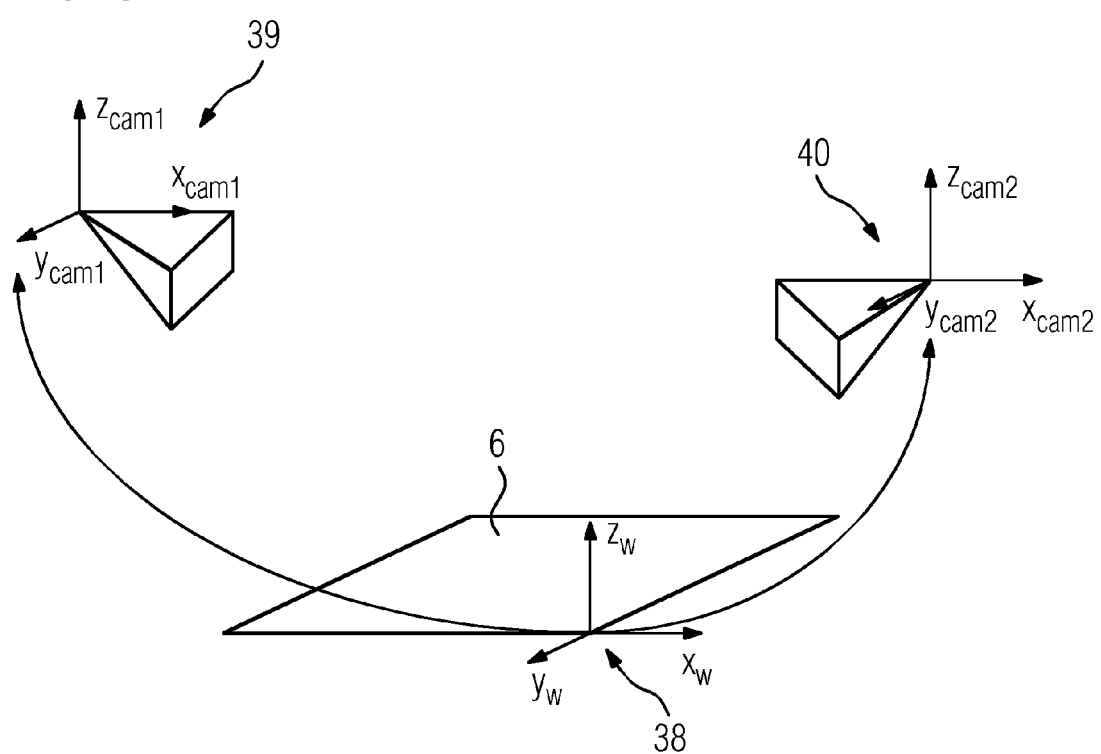
FIG. 8 shows possible coordinate systems for position fixing.

The illustration in accordance with FIG. 8 shows possible coordinate systems for position fixing, wherein a world coordinate system 38 and a first coordinate system 39 for a first camera and a second coordinate system 40 for a second camera is shown. The coordinate systems of the cameras must be calibrated extrinsically. When using a mono camera there is no second coordinate system 40 as the mono camera only requires one, e.g. the first coordinate system 39. A charging module set into the ground, for example, is the reference for all the calculated positions. This is then the world coordinate system 38. The vehicle is located via the camera, wherein the position of the camera and its orientation to the charging module and therewith to the world coordinate system are assumed to be static and are ascertained using metrological methods via one-time "calibration." The position of the camera can also be used as a world coordinate system.

The invention claimed is:

1. A positioning system for positioning a vehicle relative to a charging station for inductively charging an energy storage device of the vehicle, comprising:
   a processor unit and a camera connected to said processor unit; and
   a data storage device connected to said processor unit and configured to store therein an item of information relating to a feature of the vehicle acquired by said camera; the feature of the vehicle being selected from the group consisting of a license plate, a headlamp, an exterior rear-view mirror, a front headlamp, reversing lights, a fog lamp, and a front tire of the vehicle; and
   said processor being configured to calculate a position of the vehicle relative to a charging station based on the feature of the vehicle acquired by said camera and to generate driving instructions based on the position of the vehicle relative to the charging station.

2. The positioning system according to claim 1, wherein the item of information stored in the data storage device is a length.

3. The positioning system according to claim 1, which comprises a Human Machine Interface linked to said processor unit.

4. The positioning system according to claim 1, wherein a position of a fixed target unit is stored in said data storage device, the fixed target unit being a charging station for inductively charging the energy storage device of the vehicle.

5. A method for positioning a vehicle relative to a charging station for an inductive charging process, the method comprising:
   recording the vehicle by a camera;
   detecting at least one feature of the vehicle by said camera, the feature of the vehicle being selected from the group consisting of a license plate, a headlamp, an exterior rear-view mirror, a front headlamp, reversing lights, a fog lamp, and a front tire of the vehicle; and
   calculating a position of the vehicle relative to the charging station based on the at least one feature acquired by said camera and generating driving instructions based on the position of the vehicle relative to the charging station.

6. The method according to claim 5, which comprises calculating a length depending on a feature and calculating the position from the length and storing a value for the feature.

7. The method according to claim 5, which comprises using a world coordinate system to calculate the position.

8. The method according to claim 7, wherein the world coordinate system is determined by a position of a primary coil of a charger for the vehicle.

9. The method according to claim 5, which comprises using a value for a focal length of the camera to calculate the position.

10. The method according to claim 5, which comprises generating the driving instructions from an actual position of the vehicle relative to the charging station and a desired position of the vehicle relative to the charging station.

11. The method according to claim 10, which comprises displaying the driving instructions on a Human Machine Interface.

12. The method according to claim 11, which comprises detecting foreign bodies in an area surrounding a charging module.

13. The method according to claim 12, wherein the step of detecting foreign bodies comprises performing inductive detection.

14. The method according to claim 5, which comprises detecting a type of vehicle or an individual vehicle and using data stored about the vehicle to calculate the position of the vehicle.

15. The method according to claim 5, which comprises extrinsically calibrating the camera.

16. The method according to claim 5, which comprises providing an extrinsically calibrated camera.

* * * * *